No. 760,321. PATENTED MAY 17, 1904.
G. W. EDWARDS.
DEVICE FOR CONNECTING METAL PLATES.
APPLICATION FILED APR. 18, 1903.
NO MODEL. 2 SHEETS—SHEET 1.
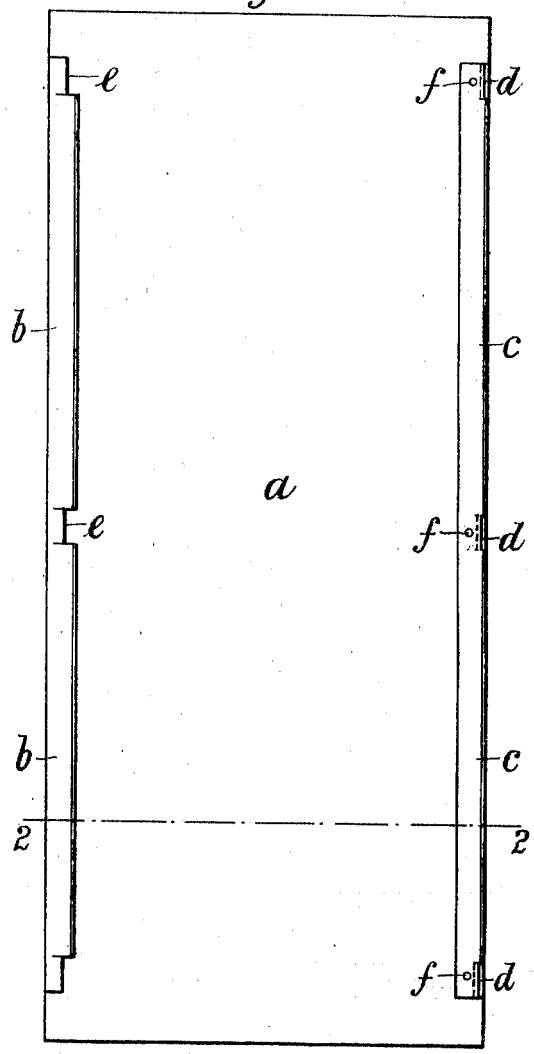
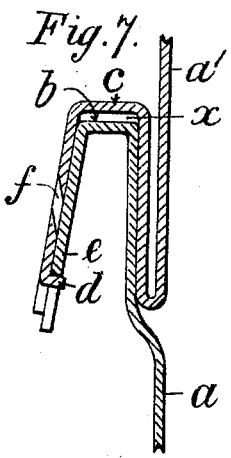
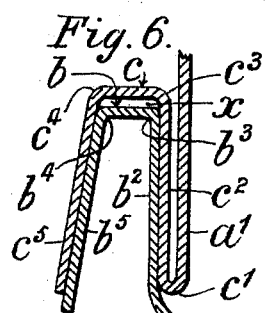
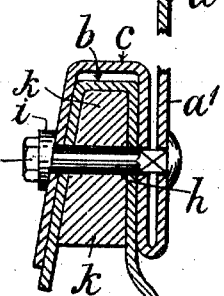
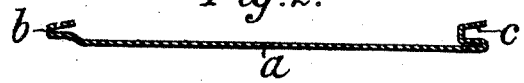

No. 760,321. PATENTED MAY 17, 1904.
G. W. EDWARDS.
DEVICE FOR CONNECTING METAL PLATES.
APPLICATION FILED APR. 18, 1903.
NO MODEL. 2 SHEETS—SHEET 2.
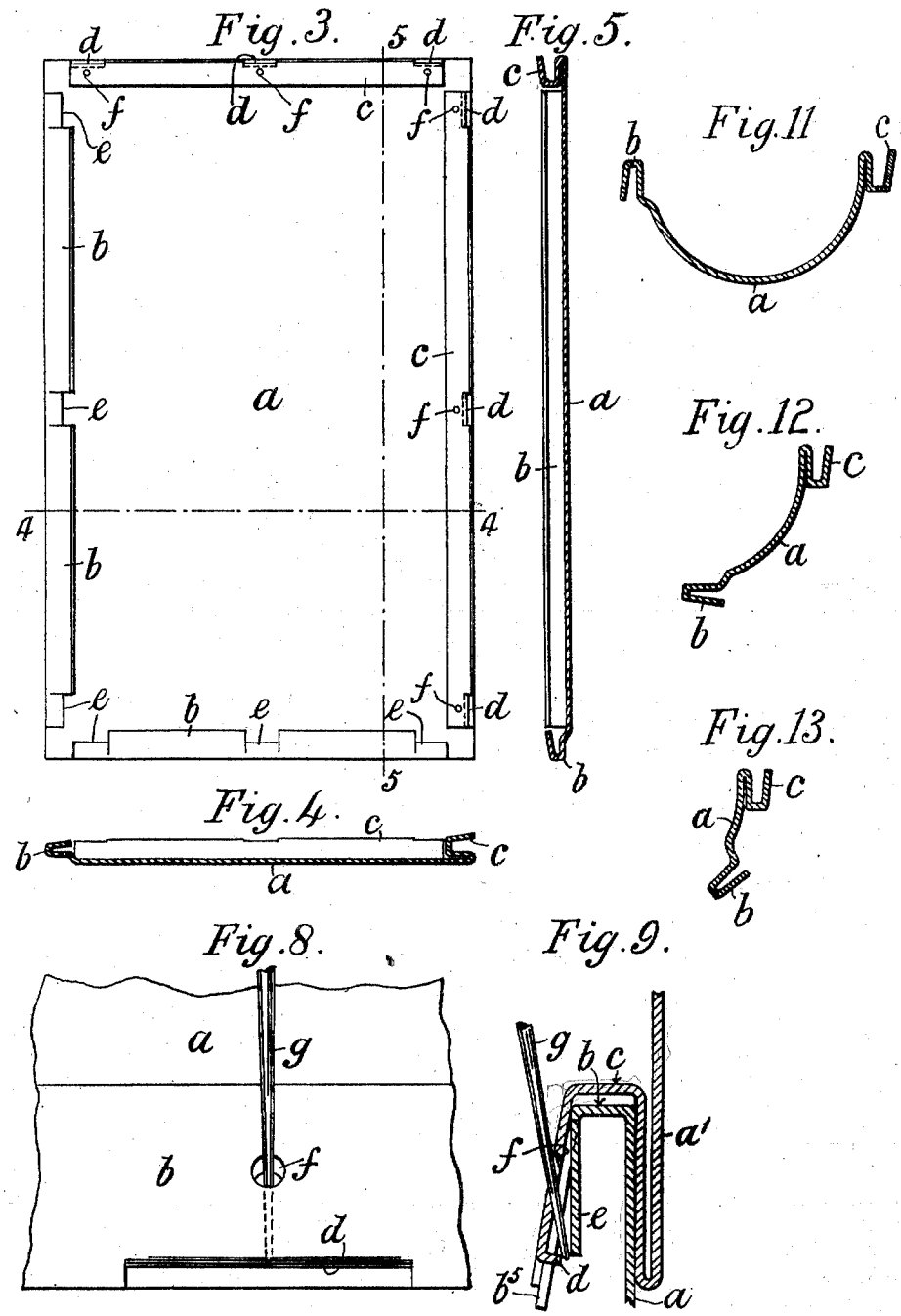

No. 760,321. Patented May 17, 1904.

UNITED STATES PATENT OFFICE.

GEORGE WYNDHAM EDWARDS, OF LONDON, ENGLAND.

DEVICE FOR CONNECTING METAL PLATES.

SPECIFICATION forming part of Letters Patent No. 760,321, dated May 17, 1904.

Application filed April 18, 1903. Serial No. 153,243. (No model.)

*To all whom it may concern:*

Be it known that I, GEORGE WYNDHAM EDWARDS, a subject of the King of Great Britain and Ireland, residing at London, England, have invented new and useful Improvements in Connecting Metal Plates Together, of which the following is a specification.

This invention relates to improved means for easily and rapidly connecting metal plates together, either temporarily or permanently, such as are used in the construction of iron buildings, roofs, gutters, walls, floors, culverts, pipes, or for any other like purpose.

According to my invention the ends of the plates to be connected are bent to such a shape as to form in the one plate a tapered male or spigot end and in the other plate a correspondingly tapered female or socket end. Also at intervals along the edge of the socket end are formed inturned clips or stop-pieces adapted, when the spigot end of one plate is fitted into the socket end of the other plate, to enter recesses cut in the spigot end and to engage with tongues on said end, thus interlocking the plates together. Means are also provided whereby said plates may be readily disconnected.

The invention is illustrated in the accompanying drawings, in which—

Figure 1 is an elevation of a rectangular plate having at one side a spigot end and at the opposite side a socket end. Fig. 2 is a cross-section on line 2 2 of Fig. 1. Fig. 3 is an elevation of a rectangular plate having male and female ends at its corresponding opposite ends and like male and female ends at its corresponding opposite sides. Fig. 4 is a cross-section on line 4 4 of Fig. 3. Fig. 5 is a cross-section on line 5 5 of Fig. 3. Fig. 6 is an enlarged section through a joint, showing two plates connected together. Fig. 7 is a section through a joint, showing the interlocking clips engaging the tongues on the spigot end. Fig. 8 is an elevation of and Fig. 9 a section through a joint, showing how the plates can be disconnected. Fig. 10 is a section through a joint, showing a way of securing the plates by nuts and bolts. Figs. 11, 12, and 13 are sectional views of curved and other shaped plates having spigot or socket ends formed at their edges.

The same letters of reference denote like parts in all the figures.

In Figs. 1 and 2 the metal plate $a$, which may be either plain, checkered, corrugated, or molded, has formed at one edge a male or spigot end $b$, extending nearly the length of the plate, and at the opposite edge a female or socket end $c$ of a corresponding length to $b$. The spigot end $b$ is formed by first bending and setting back the plate, as at $b'$, (see Fig. 6,) the part $b^2$ being parallel with the plate $a$. At $b^3$ the plate is bent outward at right angles to $b^2$ and at $b^4$ downward, so that the part $b^5$ is inclined outward at an angle to $b^2$. The socket end $c$ is formed by first bending at $c'$ the plate back upon itself, so that the part $c^2$ is parallel with the plate. At $c^3$ the plate is bent outward at right angles to $c^2$, and at $c^4$ it is bent downward, so that the part $c^5$ is inclined outward at an angle to $c^2$.

The shape and dimensions of the spigot end $b$ of one plate and of the socket end $c$ of another plate are such that they fit together as shown, and when so fitted the part $b^5$ projects beyond the part $c^5$ and the surfaces of the two plates are flush.

The space $x$ between the top of the spigot end and the upper surface of the interior of the socket end is to allow for the expansion of the plates when subjected to a varying temperature, which may be due to climate or to any other cause.

To interlock the plates, clips or stop-pieces $d$ are formed at intervals along the socket end $c$ by cutting the edge and bending inward a part of the sheet. Also at corresponding intervals along the spigot end $b$ tongues $e$, having a certain amount of spring, are formed by slitting the plate, the length of the tongues being such that the clips $d$ engage their end when the plates are fitted together.

To connect two plates $a$ and $a'$ together, the spigot end of the plate $a$ is inserted into the socket end of the plate $a'$ and forced home, the clips $d$ pressing against and springing the tongues $e$ inward until the said clips pass the end of the tongues, when the latter spring back to their initial position and become engaged with the clips, thus interlocking the two plates.

For the purpose of disconnecting the plates a hole $f$ is made in the part $c^5$ of the socket end a little above each clip $d$, and a drift or pointed rod $g$ is employed, which is inserted into the hole $f$ and pressed against the tongue $e$, causing it to spring inward until it is clear of the clip $d$, as shown in Figs. 8 and 9, when the plates can be pulled apart, and thus disconnected.

In some instances it may be desirable to secure the plates when connected by bolts and nuts, and for this purpose bolts $h$ (see Fig. 10) are passed through holes made in the joint and fitted with tapered washers $i$ and nuts $j$, packing-blocks $k$ being inserted in the spigot end to prevent the joint being crushed when the nuts are tightened up.

The plate shown in Figs. 3, 4, and 5 and having either spigot or socket ends formed at its four sides can have similar plates connected to each side, and to these plates other plates can be connected, and thus practically any area of connected plates can be built up.

Fig. 11 shows how the spigot and socket ends are arranged in a curved plate, such as might be used for culverts or for building up pipes or other purposes, and Figs. 12 and 13 show how the spigot and socket ends are arranged, in the former figure for right-angled bends and in the latter figure for bends at an angle of forty-five degrees.

The joint above described is wind and water tight, and it can be made tight against water or liquid under pressure if, when fitting up a packing of white lead, putty, tar, or other suitable substance be inserted between the spigot and socket ends of the joint.

Having now described my invention, what I claim is—

1. A joint for connecting and interlocking metal plates, comprising a male or spigot end on one plate, formed as an inclined plane or taper end and a corresponding female or socket end on a contiguous plate, and means for securing one plate to the other by means of said correlated ends.

2. Means for connecting and interlocking metal plates together, comprising a male or spigot end formed on the one plate to be connected, and a female or socket end formed on the other plate to be connected, into which the male or spigot end fits, and clips formed on the socket end adapted to engage with tongues on the spigot end when the plates are connected, thus interlocking the said plates.

3. The means for connecting metal plates together, comprising a tapered male or spigot end on one plate $a$ and a tapered female or socket end on the plate $a'$ connected to it; the male or spigot end being formed by first bending and setting back the plate $a$ so that the part $b^2$ is parallel with the plate, bending plate at $b^3$ at right angles to $b^2$, and then bending at $b^4$ downward so that part $b^5$ is at an angle to $b^2$; and the female or socket end being formed by first bending the plate $a'$ at $c'$ back upon itself so that the part $c^2$ is parallel with the plate, bending plate at $c^3$ at right angles to $c^2$, and then bending at $c^4$ downward so that the part $c^5$ is at an angle to $c^2$, the male end being made to fit the female end.

4. In plates connected together by a male or spigot end in one plate engaging a female or socket end in the other plate, the means for interlocking said plates, comprising clips formed on the socket end and adapted to engage with tongues on the spigot end when the plates are fitted together.

5. The combination with a plurality of plates united by a male or spigot end in one plate engaging a female or socket end in the other plate, of means in the spigot end for supporting and preventing the crushing thereof under pressure.

6. The combination with a plurality of plates united by a male or spigot end in one plate engaging a female or socket end in the other plate, and interlocking clips, of means for disconnecting the plates, consisting of an aperture in the outer plate for the admission to the inner plate of a drift or pointed rod, for the purpose of breaking the joint between the two plates.

In witness whereof I have hereunto signed my name in the presence of two subscribing witnesses.

GEORGE WYNDHAM EDWARDS.

Witnesses:
R. WESTACOTT,
ALFRED NUTTING.